United States Patent [19]

Hayashi et al.

[11] Patent Number: 5,699,830
[45] Date of Patent: Dec. 23, 1997

[54] SOLENOID VALVE CONTROLLER

[75] Inventors: Bunya Hayashi; Keisuke Shimauchi, both of Yawara, Japan

[73] Assignee: SMC Corporation, Tokyo, Japan

[21] Appl. No.: 548,135

[22] Filed: Oct. 25, 1995

[30] Foreign Application Priority Data

Dec. 2, 1994 [JP] Japan .................. 6-329712

[51] Int. Cl.⁶ .................. F16K 37/00; F16K 31/06
[52] U.S. Cl. .................. 137/554; 137/269; 137/551; 137/560; 137/884
[58] Field of Search .................. 137/269, 551, 137/554, 884, 560; 200/2, 5 A, 178, 308, 310

[56] References Cited

U.S. PATENT DOCUMENTS

| | | | |
|---|---|---|---|
| 4,815,496 | 3/1989 | Nishitani et al. | 137/884 |
| 4,938,258 | 7/1990 | Sato | 137/884 |
| 5,333,647 | 8/1994 | Fukano et al. | 137/884 |
| 5,437,306 | 8/1995 | Asou et al. | 137/884 X |
| 5,458,048 | 10/1995 | Hohner | 137/884 X |

FOREIGN PATENT DOCUMENTS

| | | |
|---|---|---|
| 74 34 476 | 3/1975 | Germany. |
| 0203780 | 8/1989 | Japan .................. 137/884 |

Primary Examiner—John Rivell
Attorney, Agent, or Firm—Oblon, Spivak, McClelland, Maier & Neustadt, P.C.

[57] ABSTRACT

The present invention provides a solenoid valve controller with simple arrangement, by which it is possible to easily check connecting conditions and operating conditions of solenoid valves. Between a plurality of solenoid valves 11 intensively installed and a serial unit 2 for performing on-off control of each of the solenoid valves according to a control signal from the controller, a switch unit 3 having a plurality of manual switches 30a to 30n to match each of the solenoid valves 11 is connected, and it is designed that each of the manual switches can be switched over to a first switching position to connect the solenoid valves 11 to output terminals 21a to 21n of the serial unit and to a second switching position to connect the solenoid valves to power terminals 20a and 20b.

5 Claims, 2 Drawing Sheets

SOLENOID VALVE CONTROLLER

BACKGROUND OF THE INVENTION

The present invention relates to a solenoid valve controller for easily checking connecting and operating conditions of solenoid valves, which control pressure fluid in a fluid pressure-using equipment or device using pressure fluid such as compressed air.

For example, in case a fluid pressure equipment using a pressure fluid such as compressed air is newly installed in a factory or in case maintenance is performed on an existing equipment, it is necessary to strictly check whether solenoid valves connected to the line for controlling the pressure fluid is correctly connected with the controller or whether the solenoid valves are operated in perfect manner.

In the past, it has been practiced to operate the solenoid valves by the controller to check the connection and the operation. However, in case the controller is installed at a position far from the solenoid valves, such operation is often troublesome and complicated and it is difficult to confirm the operating conditions. Also, to check a plurality of solenoid valves independently, switches and pushbuttons for checking purpose must be installed on the controller, and this results in more complicated arrangement in the structure and the wiring of the controller.

SUMMARY OF THE INVENTION

It is an object of the present invention to provide a solenoid valve controller with simple arrangement, by which it is possible to easily check connecting and operating conditions of solenoid valves.

To solve the above problems, the solenoid valve controller according to the present invention comprises a plurality of solenoid valves intensively installed for controlling pressure fluid, a serial unit for performing on-off control of said plurality of solenoid valves according to a control signal from the controller, and a switch unit electrically connected between said solenoid valves and the serial unit, whereby said switch unit is equipped with a plurality of manual switches to match each of the solenoid valves, and said manual switches can be switched over to a switching position for connecting the solenoid valves to output terminals of the serial unit and to a switching position for connecting to power terminals.

According to a preferred aspect of the present invention, the solenoid valves, the switch unit and the serial unit are intensively installed on a common mounting member.

In order to confirm that each of the manual switches in the switch unit is in switching condition during operation, i.e. each of the manual switches is at a switching position for receiving the control signal from the controller, it is preferable that sub-switches are provided, which are turned on or off in response to manual operation of the manual switches and that the sub-switches are connected in series between detection terminals.

Also, in another preferred embodiment of the present invention, the switch unit is removably provided, and the solenoid valves and the serial unit can be directly connected by removing the switch unit.

In the solenoid valve controller with the above arrangement, it is possible to turn on the solenoid valve according to a serial signal from the controller by switching one of the manual switches to a switching position connected to the output terminals of the serial unit. Also, by switching to a switching position connected to the feeding terminals, the solenoid valve can be directly turned on through the power source.

Therefore, it is possible to easily check connecting conditions or operating conditions of any solenoid valve as desired by switching over the manual switches on the switch unit without performing on-off control of the serial signals from the controller.

When all of the manual switches have been switched over to the switching position connected to the output terminals of the serial unit, all solenoid valves can be turned on and off according to the serial signals from the controller as in actual operation. In this case, the sub-switches are also switched over at the same time and the detection circuit is closed. Thus, it is possible to confirm by a detector connected to a detection terminal that all manual switches are at the switching position for receiving the serial signals.

DETAILED DESCRIPTION OF THE PREFERRED EMBODIMENT

Figure 1:
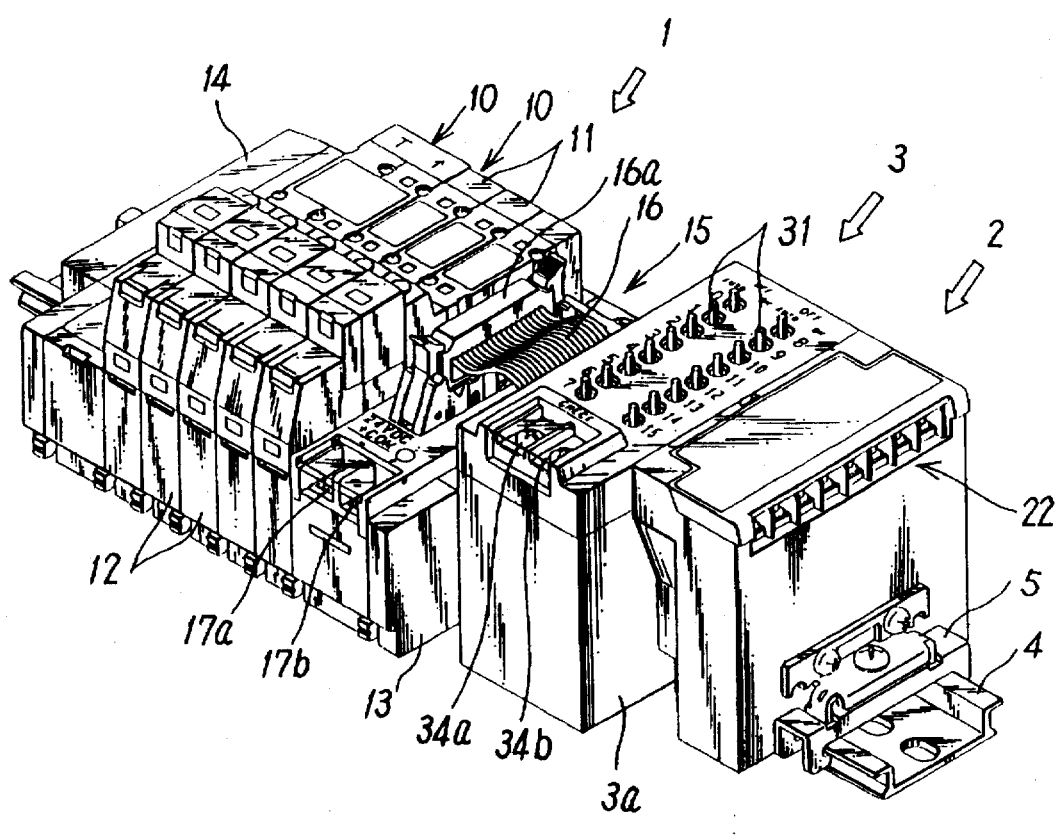
FIG. 1 is a perspective view of an embodiment of a solenoid valve controller according to the present invention.

In the following, description will be given on an embodiment of the present invention referring to the drawings. In FIG. 1, reference numeral 1 represents a solenoid valve aggregate, in which a plurality of solenoid valves 11 for controlling pressure fluid are intensively assembled together, reference numeral 2 represents a serial unit for performing on-off control of each of said solenoid valves 11 based on control signals from the controller, and the reference numeral 3 represents a switch unit electrically connected between the solenoid valves 11 and the serial unit 2. The solenoid valve aggregate 1, the serial unit 2, and the switch unit 3 are intensively installed on a rail 4 serving as a common mounting member and are supported from both sides using fixtures 5 mounted on said rail 4.

The solenoid valves 11 are mounted on manifold bases 12 for supplying pressure fluid to actuators such as air cylinders. A plurality of manifold valves 10, which comprise these solenoid valves and the manifold bases 12, are aligned and connected together in horizontal direction and are integrally connected together with end plates 13 and 14 at both ends to make up said solenoid valve aggregate 1.

On one of the end plates 13 in the above solenoid valve aggregate 1, an electrical connection 15 equipped with a plurality of terminals for connecting power to each of the solenoid valves 11 is provided, and a cable 16 is removably connected between the electrical connection 15 and the switch unit 3 via a plug 16a. On the end plate 13, power terminals 17a and 17b connected to feeding terminals 20a and 20b (FIG. 2) of the serial unit 2 are arranged.

Figure 2:
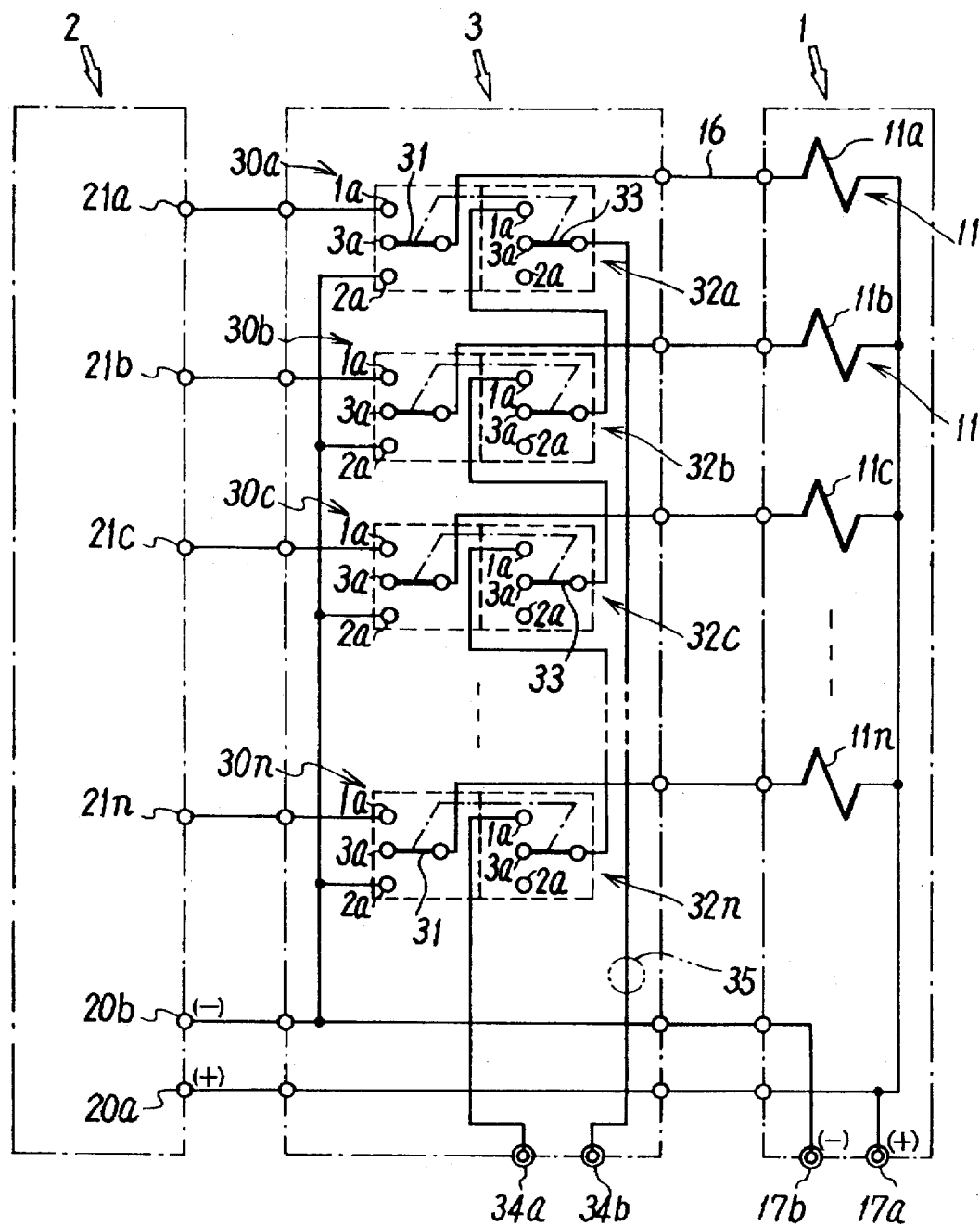
FIG. 2 is a circuit diagram of the solenoid valve controller shown in FIG. 1.

As it is evident from FIG. 2, the switch unit 3 comprises a plurality of manual switches 30a to 30n to match each of the solenoid valves 11, and operating pieces 31 of the manual switches 30a to 30n are aligned on upper surface of a switch box 3a. These manual operating switches 30a to 30n have a first, a second and a third contacts 1a, 2a and 3a, respectively, and the operating pieces 31 can be switched over to three switching positions, i.e. a first, a second and a third switching positions, to have contact with these contacts 1a, 2a and 3a. The first contact 1a of each of the manual switches 30a to 30n is connected to each of output terminals 21a to 21n exclusively used for solenoid valves arranged on the serial unit 2. The second contact 2a is connected to a negative side 20b of the feeding terminals 20a and 20b in the serial unit 2. The third contact 3a is opened, and the operating pieces 31 are independently connected to one end of windings of the solenoids 11a to 11n in the solenoid valves 11 via the cable 16, and each of the other ends of the windings of the solenoids 11a to 11n is connected to a positive side 20a of each of the feeding terminals 20a and 20b.

Electrical connection between the switch unit 3 and the serial unit 2 may be achieved via a cable, which connects the solenoid valve aggregate 1 with the switch unit 3. Or, plugs and sockets may be directly formed on each body, and connection may be made by engaging these with each other. Or, the connection between the solenoid valve aggregate 1 and the switch unit 3 may be made directly by plugs and sockets instead of the cable 16. In any case, it is important that the solenoid valve aggregate 1 can be electrically connected with the serial unit 2 in case the switch unit 3 is removed.

On the manual switches 30a to 30n of the switch unit 3, sub-switches 32a to 32n for turning on and off in response to the manual operation are provided. A first contact 1a and an operating piece 33 of each of the sub-switches 32a to 32n are connected in series between detection terminals 34a and 34b for detecting switching state of the manual switches 30a to 30n. When all manual switches 30a to 30n are at the first switching position, the detection circuit is closed by the sub-switches 32a to 32n.

Further, the serial unit 2 is equipped with a plurality of input terminals 22 (FIG. 1), and these input terminals 22 are connected to the controller for receiving serial signals from the controller and are also connected to a power source.

In the solenoid valve controller with the above arrangement, when power is supplied from the output terminals 21a to 21n or the power terminals 20a and 20b of the serial unit 2, the desired solenoid valve 11 can be turned on or off as desired without on-off control of the serial signals from the controller by operating the manual switches 30a to 30n of the switch unit 3. Specifically, by switching over the operating piece 31 of one of the manual switches 30a to 30n to a first switching position connected to the first contact 1a from a third switching position (neutral position in contact with the third contact 3a) shown in FIG. 2, it is possible to turn on the solenoid valve 11 corresponding to the manual switches 30a to 30n according to the serial signals from the output terminals 21 to 21n of the serial unit. The solenoid valve 11 can be turned off by switching over to the third switching position again. By switching the operating piece 31 to a second switching position connected to the second contact 2a, power is connected and the solenoid valve 11 can be directly turned on.

When all of the manual switches 30a to 30n are switched over to the first switching position connected to the first contact 1a, all solenoid valves 11 can be turned on or off according to the serial signals from the controller as in actual operation. In this case, each of the sub-switches 32a to 32n is also switched over to the first switching position at the same time, and detection circuit is closed.

As a result, it is possible to confirm by detectors connected to the detection terminals 34a and 34b that all manual switches 30a to 30n are at the first switching position (for receiving the serial signals). To the detection circuit, an indicator lamp 35, which is turned on when the detection circuit is closed, can be connected.

As described above, by operating the manual switches 30a to 30n in the switch unit 3, it is possible to easily check connecting and operating conditions of any of the solenoid valves 11 as desired without performing on-off control of the serial signal from the controller.

Moreover, the operating procedure is easy to perform and operating condition of solenoid valves can be easily confirmed because the solenoid valve aggregate 1, the serial unit 2 and the switch unit 3 are intensively installed on the rail 4, which serves as a common mounting member.

When the checking procedure has been completed, the switch unit 3 can be removed as necessary. In this case, the solenoid valve aggregate 1 and the serial unit 2 are electrically and directly connected with each other.

As described above in detail, the switch unit is provided between the solenoid valves and the serial unit. Accordingly, it is possible to easily check connecting conditions and operating conditions of the solenoid valves as desired by operating the manual switches of the switch unit and without performing on-off control of the serial signals by the controller.

What we claim are:

1. A solenoid valve controller, comprising a plurality of solenoid valves intensively installed for controlling pressure fluid, a serial unit for performing on-off control of each of said solenoid valves according to a control signal from the controller, and a switch unit electrically connected between said solenoid valves and said serial unit, whereby:

said switch unit is equipped with a plurality of manual switches to match each of the solenoid valves, and said manual switches can be switched over to a switching position to connect the solenoid valves to output terminals of the serial unit and to a switching position to connect the solenoid valves to power terminals.

2. A solenoid valve controller according to claim 1, wherein said solenoid valves, said switch unit and said serial unit are intensively installed on a common mounting member.

3. A solenoid valve controller according to claims 1 or 2, wherein each of the manual switches of the switch unit has a sub-switch to be turned on and off in response to manual operation, and these sub-switches are connected in series between detection terminals for detecting switching condition of the manual switches.

4. A solenoid valve controller according to one of claims 1 or 2, wherein the switch unit is removably installed, and the solenoid valves and the serial unit can be directly connected by removing the switch unit.

5. A solenoid valve controller according to claim 3, wherein the switch unit is removably installed, and the solenoid valves and the serial unit can be directly connected by removing the switch unit.

* * * * *